United States Patent
Hirota et al.

(10) Patent No.: US 11,796,043 B1
(45) Date of Patent: Oct. 24, 2023

(54) DIFFERENTIAL DEVICE

(71) Applicant: GKN Automotive Limited, Birmingham (GB)

(72) Inventors: Isao Hirota, Tochigi (JP); Kazutaka Kawata, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/931,556

(22) Filed: Sep. 13, 2022

(51) Int. Cl.
  *F16H 48/22* (2006.01)
  *F16H 48/34* (2012.01)
  *F16H 48/08* (2006.01)

(52) U.S. Cl.
  CPC ....... *F16H 48/22* (2013.01); *F16H 2048/082* (2013.01); *F16H 2048/343* (2013.01)

(58) Field of Classification Search
  CPC .......... F16H 2048/434; F16H 48/08–2048/087
  See application file for complete search history.

(56) References Cited

U.S. PATENT DOCUMENTS

| 4,644,823 A * | 2/1987 | Mueller ................. F16H 48/30 475/86 |
| 2002/0088683 A1 | 7/2002 | Nestler et al. |
| 2004/0050643 A1* | 3/2004 | Krzesicki ............. F16H 48/295 192/84.91 |

FOREIGN PATENT DOCUMENTS

| CN | 107339400 A * | 11/2017 | |
| DE | 3518682 A1 * | 11/1986 | ............. F16D 35/00 |
| DE | 102011015997 A1 * | 4/2012 | ......... B60K 23/0808 |
| JP | 2002262511 A | 9/2002 | |

* cited by examiner

Primary Examiner — Ernesto A Suarez
Assistant Examiner — James J Taylor, II
(74) Attorney, Agent, or Firm — Bejin Bieneman PLC

(57) ABSTRACT

A differential device includes a differential case, a first output gear and a second output gear, and an interrupting mechanism. The differential case is rotatable. A drive force can be input to the differential case. The first output gear and the second output gear are accommodated in the differential case. The first output gear and a second output are rotatable with respect to the differential case and output the drive force received from the differential case. The interrupting mechanism is disposed on a side of the first output gear and connects and disconnects power transmission between the differential case and the first output gear. The first output gear is coupled to an output shaft through an intermediate member.

5 Claims, 3 Drawing Sheets

US 11,796,043 B1

DIFFERENTIAL DEVICE

TECHNICAL FIELD

The present disclosure relates to a differential device.

BACKGROUND

JP2002-262511A discloses a differential device. The differential device includes a rotatable differential case to which a drive force is input, and a pair of output gears that are accommodated in the differential case so as to be rotatable with respect to the differential case and output the drive force received from the differential case. The differential device includes an interrupting mechanism that is disposed on one output gear side of a pair of output gears and connects and disconnects power transmission between a differential case and one output gear.

In the differential device, the differential case and the one output gear are connected by connecting the interrupting mechanism. When the differential case and the one output gear are connected, relative rotation between the pair of output gears is restricted.

In the differential device, a pair of output shafts connected to an output-side mechanism are coupled to the pair of output gears, respectively. In the differential device, arrangement positions of the pair of output gears are shifted on one side in a rotation axis direction in the differential case since the interrupting mechanism is provided, and thus the output shaft of the pair of output shafts which is on the one output gear side on which the interrupting mechanism is provided is longer than the output shaft on the other output gear side. Accordingly, lengths of the pair of output shafts are different with respect to each other.

When the pair of output shafts have different lengths, however, incorrect assembly may occur in which different output shafts are assembled to the pair of output gears. Preventing incorrect assembly is complicated and can make the assembly process difficult. Further, when the pair of output shafts have different lengths, two types of output shafts may have different rigidity, leading to complexity of component design and a cost increase in manufacturing components.

SUMMARY

The present disclosure relates to a differential device that can improve an assembly process and can reduce costs.

In accordance with one or more embodiments, a differential device includes a differential case, a first output gear and a second output gear, and an interrupting mechanism. The differential case is rotatable. A drive force can be input to the differential case. The first output gear and the second output gear are accommodated in the differential case. The first output gear and a second output are rotatable with respect to the differential case, and can output the drive force received from the differential case. The interrupting mechanism is disposed on a side of the first output gear and connects and disconnects power transmission between the differential case and the first output gear. The first output gear is coupled to an output shaft through an intermediate member.

DESCRIPTION OF EMBODIMENTS

Figure 1:
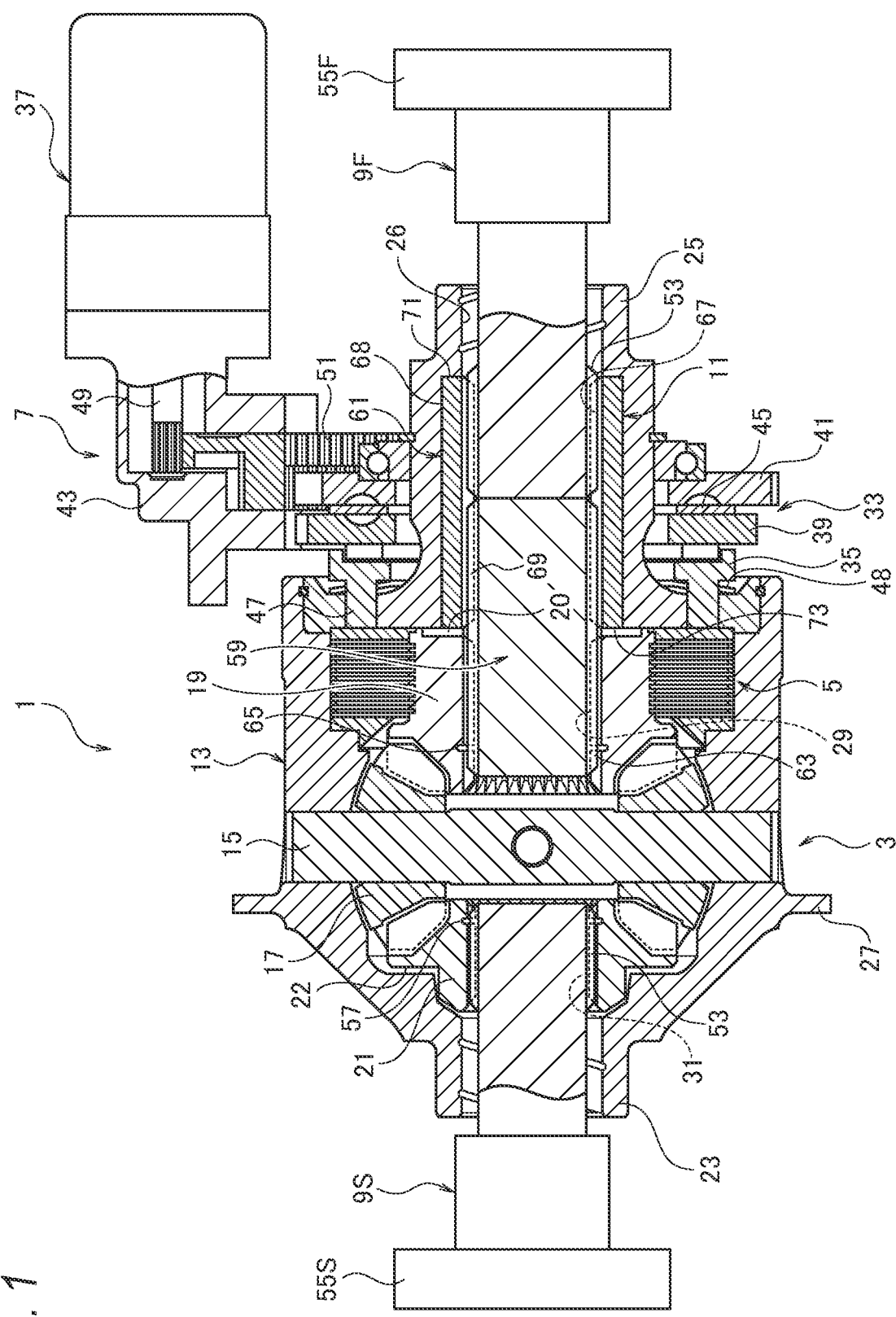
FIG. 1 is a cross-sectional view of a differential device according to a first embodiment.

Hereinafter, a differential device according to a first embodiment will be described in detail with reference to FIG. 1. Dimensional ratios in the drawings are exaggerated for convenience of description, and may be different from actual ratios.

As shown in FIG. 1, a differential device 1 according to the first embodiment is disposed, for example, between a drive source (not shown) such as an engine or an electric motor and right and left wheels (not shown). A drive force from the drive source is transmitted to the differential device 1 through a transmission (not shown), and is distributed to the left and right wheels through a pair of output shafts 9F, 9S. The differential device 1 includes a differential mechanism 3, an interrupting mechanism 5, an actuator 7, the pair of output shafts 9F, 9S, and an intermediate member 11. The differential device 1 and the pair of output shafts 9F, 9S of the first embodiment are disposed, for example, in a rigid axle housing (not shown) suspended by a leaf spring or a coil spring.

The differential mechanism 3 includes a differential case 13, pinion shafts 15 integrally rotatably fixed to the differential case, pinions 17 rotatably supported by the pinion shafts 15, and a pair of output gears 19, 21 that mesh with the pinions 17 at a position where the pair of output gears 19, 21 face the pinions 17.

The differential case 13 is rotatably supported on a stationary member (not shown) such as a carrier by a bearing (not shown) on an outer periphery of each of boss portions 23, 25 provided on two end sides of the differential case 13 in an axial direction. The differential case 13 includes a flange portion 27 to which a ring gear (not shown) is fixed.

The ring gear fixed to the flange portion 27 meshes with, for example, a power transmission gear (not shown) that transmits a drive force from a drive source, receives the drive force, and rotationally drives the differential case 13. The differential case 13 accommodates the pinion shafts 15, the pinions 17, and the pair of output gears 19, 21.

The pinion shafts 15 includes one long pinion shaft and two short pinion shafts. The long pinion shaft has two end portions engaged with holes formed in the differential case 13 to prevent the long pinion shaft from slipping out, and the long pinion shaft is rotationally driven integrally with the differential case 13. The short pinion shaft has one end portion engaged with a hole formed in a central portion of the long pinion shaft and the other end portion engaged with a hole formed in the differential case 13 to prevent the short pinion shaft from slipping out, and the short pinion shaft is rotationally driven integrally with the differential case 13. The pinions 17 are respectively supported on outer end portion sides of the pinion shafts 15.

A plurality of (in the present example, four) pinions 17 are arranged at equal intervals in a circumferential direction of the differential case 13. The plurality of pinions 17 are supported on the end portion sides of the pinion shafts 15 and revolve by the rotation of the differential case 13. The pinions 17 are rotatably supported on the pinion shaft 15 in a manner of being rotationally driven when a differential rotation occurs between the pair of output gears 19, 21 that mesh with the pinions 17. The pinions 17 transmit the drive force input to the differential case 13 to the pair of output gears 19, 21.

The pair of output gears 19, 21 are accommodated in the differential case 13 so as to be rotatable with respect to the differential case 13. The pair of output gears 19, 21 mesh with the pinions 17. Spline-shaped output portions 29, 31 are provided on inner peripheral sides of the pair of output gears 19, 21. The spline-shaped output portions 29, 31 output the drive force transmitted to the pair of output gears 19, 21. Slide washers 20, 22 are disposed between open end sides of the pair of output gears 19, 21 in the axial direction and side walls of the differential case 13.

In the differential mechanism 3, the drive force from the drive source is input to the differential case 13. The drive force input to the differential case 13 is transmitted to the pair of output gears 19, 21 through the pinions 17. The drive force transmitted to the pair of output gears 19, 21 is distributed and output to the left and right wheels. A differential in the differential mechanism 3 is connected and disconnected by the interrupting mechanism 5.

The interrupting mechanism 5 is disposed in a radial direction between the differential case 13 and a first output gear 19 of the pair of output gears 19, 21. The interrupting mechanism 5 includes a multi-plate clutch including a plurality of outer clutch plates and a plurality of inner clutch plates.

The plurality of outer clutch plates are engaged with, at a spline-shaped engagement portion formed on an inner periphery of the differential case 13, the differential case 13 in a manner of being movable in the axial direction and integrally rotatable with the differential case 13. The plurality of inner clutch plates are alternately arranged in the axial direction with the plurality of outer clutch plates, and are engaged with, at a spline-shaped engagement portion formed on an outer periphery of a boss portion of the first output gear 19, the first output gear 19 in a manner of being movable in the axial direction and integrally rotatable with the first output gear 19.

The interrupting mechanism 5 is a friction clutch including a plurality of control type clutch plates capable of intermediate control of a transmission torque with sliding friction. The interrupting mechanism 5 connects the differential case 13 and the first output gear 19 in accordance with the amount of fastening, and limits the differential in the differential mechanism 3. The differential device 1 including a mechanism that frictionally limits the differential of the differential mechanism 3 is referred to as a limited slip differential (LSD). The interrupting mechanism 5 is pressed and fastened in the axial direction by the actuator 7.

The actuator 7 includes a cam mechanism 33, a pressing member 35, and an electric motor 37.

The cam mechanism 33 includes a movable member 39, a rotatable member 41, and cam balls (not shown).

The movable member 39 has an annular shape and is disposed on the outer periphery of the boss portion 25 of the differential case 13. The movable member 39 is prevented from rotating relative to a stationary member 43 such as a fixing member fixed to the carrier, and is movable in the axial direction. The movable member 39 has a plurality of cam surfaces in the circumferential direction on a surface that faces the rotatable member 41 in the axial direction.

The rotatable member 41 has an annular shape, and is adjacent to the movable member 39 on the outer periphery of the boss portion 25 of the differential case 13. The rotatable member 41 is rotatable via a bearing, and is restricted from moving outward in the axial direction by the bearing. The rotatable member 41 includes a gear portion on an outer periphery thereof. The rotatable member 41 has a plurality of cam surfaces having the same inclination as the movable member 39 in the circumferential direction on a surface that faces the movable member 39 in the axial direction.

A plurality of cam balls are rotatably held by an annular holding member 45 disposed between the movable member 39 and the rotatable member 41 in the axial direction. The plurality of cam balls are interposed between the cam surfaces of the movable member 39 and the cam surfaces of the rotatable member 41. The cam balls generate a cam thrust force for moving the movable member 39 in the axial direction toward the interrupting mechanism 5 by a relative differential rotation occurring between the movable member 39 and the rotatable member 41 due to the rotation of the rotatable member 41.

The pressing member 35 has an annular shape, and is adjacent to the movable member 39 through a thrust bearing on the outer periphery of the boss portion 25 of the differential case 13. The pressing member 35 is movable in the axial direction by an axial movement of the movable member 39. The pressing member 35 includes a plurality of rod-shaped pressing portions 47 that can be inserted through a plurality of holes formed in the differential case 13, and that can press the interrupting mechanism 5.

The pressing member 35 is axially moved toward the interrupting mechanism 5 by the cam thrust force generated by the cam mechanism 33, presses the interrupting mechanism 5 by the pressing portions 47, and fastens the interrupting mechanism 5. A return spring 48, which biases the pressing member 35 in a fastening release direction of the interrupting mechanism 5, is disposed between the pressing member 35 and the differential case 13 in the axial direction.

The electric motor 37 has a main body fixed to the stationary member 43. The electric motor 37 has a motor shaft 49 meshing with a gear member 51 rotatably supported on the stationary member 43. The gear member 51 includes a small-diameter gear portion, and the small-diameter gear portion meshes with a gear portion of the rotatable member 41 of the cam mechanism 33. The electric motor 37 rotates the rotatable member 41 via the gear member 51 by the rotation of the motor shaft 49. By the rotation of the rotatable member 41, a cam thrust force is generated by the cam mechanism 33.

The electric motor 37 of the actuator 7 is electrically connected to a controller (not shown) that controls the operation of each mechanism of the vehicle. The actuator 7 is controlled by the controller to energize the electric motor 37 in accordance with a fastening torque of the interrupting mechanism 5. By the operation of the actuator 7, the interrupting mechanism 5 is fastened, and the differential of the pair of output gears 19, 21 is restricted. A first output shaft 9F of the pair of output shafts 9F, 9S is integrally rotatably coupled to the first output gear 19 of the pair of output gears 19, 21. A second output shaft 9S of the pair of output shafts 9F, 9S is integrally rotatably coupled to a second output gear 21 of the pair of output gears 19, 21.

In a pair of output shafts, the interrupting mechanism 5 is disposed on an outer peripheral side of the first output gear 19, the differential mechanism 3 is shifted on one side in the axial direction of the differential case 13, and accordingly, the pair of output gears 19, 21 are also shifted in the axial direction. Therefore, according to the related art, an output shaft connected to an output gear to which an interrupting mechanism is provided is longer than an output shaft connected to an output gear to which the interrupting mechanism is not provided. When the pair of output shafts have different lengths, incorrect assembly in which different output shafts are assembled to the pair of output gears may occur. For this reason, in the related art, the assembly is complicated to prevent erroneous assembly and the assembling workability is deteriorated. Further, when the pair of output shafts have different lengths, two types of output shafts tend to have different rigidity, leading to complexity of component design and a cost increase in manufacturing components.

Therefore, according to the present embodiment, the pair of output shafts 9F, 9F coupled to the differential device have the same length with each other and are formed in the same shape with each other. The pair of output shafts 9F, 9S each include a spline-shaped coupling portion 53 on one end side thereof. The pair of output shafts 9F, 9S are inserted into a tubular rigid axle housing and supported by a bearing, so that flange-shaped attachment portions 55, 55 on the other end side of the pair of output shafts 9F, 9S are coupled and fixed to flange portions of the left and right wheels. Alternatively, according to left and right independent suspension systems, the pair of output shafts 9F, 9S are connected to the left and right wheels at the flange-shaped attachment portions 55 in a manner of being integrally rotatable via constant velocity joints.

The coupling portion 53 of a second output shaft 9S of the pair of output shafts 9F, 9S is integrally rotatably connected to the output portion 31 of the second output gear 21, and is integrally rotatable with the second output gear 21. A restriction member 57 such as a C clip is disposed between the coupling portion 53 and the output portion 31 in the radial direction, so that the output second gear 21 and the second output shaft 9S are positioned in the axial direction. The first output shaft 9F of the pair of output shafts 9F, 9S is integrally rotatably connected to the first output gear 19 through the intermediate member 11.

The intermediate member 11 includes a first connecting member 59 and a second connecting member 61.

The first connecting member 59 is formed as a solid shaft. The first connecting member 59 includes a spline-shaped first connecting portion 63 on an outer periphery thereof. The first connecting portion 63 is integrally rotatably connected to the output portion 29 of the first output gear 19, so that the first output gear 19 and the first connecting member 59 are integrally rotatable. A restriction member 65 such as a C clip is disposed between the first connecting portion 63 and the first output portion 29 in the radial direction, so that the first output gear 19 and the first connecting member 59 are positioned in the axial direction. The first connecting member 59 may have an axial end surface abutted against an outer surface of the pinion shaft 15 to restrict the movement of the first connecting member 59 toward an inner side in the axial direction. The interrupting mechanism 5 is disposed on an outer peripheral side of the first connecting member 59.

The second connecting member 61 is formed as a hollow shaft. The second connecting member 61 includes a spline-shaped second connecting portion 67 on an inner periphery thereof. The coupling portion 53 of the first output shaft 9F is integrally rotatably connected to the second connecting portion 67, so that the first output shaft 9F and the second connecting member 61 are integrally rotatable. The first connecting portion 63 of the first connecting member 59 is integrally rotatably connected to the second connecting portion 67, and a portion where the first connecting portion 63 and the second connecting portion 67 are connected is a third connecting portion 69. The third connecting portion 69 can integrally rotate the first connecting member 59 and the second connecting member 61, and can integrally rotate the first output gear 19 and the first output shaft 9F by the intermediate member 11. The actuator 7 is disposed on an outer peripheral side of the second connecting member 61.

Inside the second connecting member 61, an axial end surface of the first connecting member 59 abuts against an axial end surface of the first output shaft 9F, so that the first connecting member 59 and the first output shaft 9F are positioned in the axial direction. A first end wall 71 and a second end wall 73 are provided on two axial end sides of the second connecting member 61, respectively. The first end wall 71 is abutted against a step portion formed on an inner peripheral surface of the boss portion 25 of the differential case 13. The abutment between the first end wall 71 and the step portion of the differential case 13 restricts the movement of the intermediate member 11 to an outer side in the axial direction. The second end wall 73 is abutted against an axial end surface of the first output gear 19. The abutment between the second end wall 73 and the end surface of the first output gear 19 restricts the movement of the intermediate member 11 toward the inner side in the axial direction.

A large-diameter portion 68 of the intermediate member 11 is adjacent to one side in the axial direction of the boss portion 25 of the differential case 13, and the large-diameter portion 68 of the intermediate member 11 is larger in diameter than an inner peripheral diameter 26 of the boss portion. For this reason, lubricating oil flowing to the inner periphery of the boss portion 25 is distributed to the large-diameter portion 68 of the intermediate member 11 by a centrifugal force, and lubrication of an outer peripheral support sliding surface of the intermediate member 11 supported by the differential case 13 is excellent.

In this way, by integrally rotatably connecting the first output gear 19 and the first output shaft 9F by the intermediate member 11, the lengths of the first output shaft 9F and the second output shaft 9S can be made equal to each other. For this reason, the first output shaft 9F and the second output shaft 9S can be formed as the same component, and the cost can be reduced. Since the first output shaft 9 and the second output shaft 9S are formed as the same component, incorrect assembly does not occur, and assembly performance can be improved. Further, sizes and rigidity of the first output shaft 9F and the second output 9S can be made equal to each other, and thus complexity of component design and a cost increase in manufacturing can be prevented.

The differential device 1 includes the rotatable differential case 13 that receives drive force, and the pair of output gears 19, 21 that are accommodated in the differential case 13 so as to be rotatable relative to the differential case 13 and output the drive force received from the differential case 13. The differential device 1 further includes the interrupting mechanism 5 that is disposed on the side of the first output gear 19 among the pair of output gears 19, 21 and connects and disconnects power transmission between the differential case 13 and the first output gear 19. The first output gear 19 is coupled to the first output shaft 9F through the intermediate member 11.

Therefore, in the differential device 1, the assembly process can be improved, and costs can be reduced.

Further, the intermediate member 11 includes the first connecting portion 63 integrally rotatably connected to the inner peripheral side of the first output gear 19, and the second connecting portion 67 integrally rotatably connected to the outer peripheral side of the first output shaft 9F.

Therefore, by adjusting the length of the intermediate member 11, it is possible to easily assemble the intermediate member 11 to the first output gear 19 and the first output shaft 9F while absorbing a positional offset between the pair of output shafts due to the arrangement of the interrupting mechanism 5.

The intermediate member 11 further includes the first connecting member 59 including the first connecting portion 63 and the second connecting member 61 including the second connecting portion 67. The first connecting member 59 and the second connecting member 61 are integrally rotatably connected by the third connecting portion 69.

Therefore, by adjusting the length of one of the first connecting member 59 and the second connecting member 61, the positional offset between the pair of output shafts due to the arrangement of the interrupting mechanism 5 can be absorbed.

The intermediate member 11 includes the first end wall 71 and the second end wall 73 that are restricted from moving in the axial direction between the differential case 13 and the output gear 19.

For this reason, the intermediate member 11 is positioned in the axial direction by the first end wall 71 and the second end wall 73, and the output gear 19 and the output shaft 9 can be stably and integrally rotatably connected by the intermediate member 11.

Further, the actuator 7 that actuates the interrupting mechanism 5 is disposed on the outer peripheral side of the intermediate member 11.

For this reason, even when the actuator 7 is disposed on the side of the first output gear 19, the intermediate member 11 can absorb the positional offset between the pair of output shafts.

Next, a differential device 1' according to a second embodiment will be described in detail with reference to FIG. 2. Dimensional ratios in the drawings are exaggerated for convenience of description, and may be different from actual ratios. The same members as those of the first embodiment described above are denoted by the same reference numerals in FIG. 2, and descriptions of overlapping configurations and functions thereof will be omitted.

Figure 2:
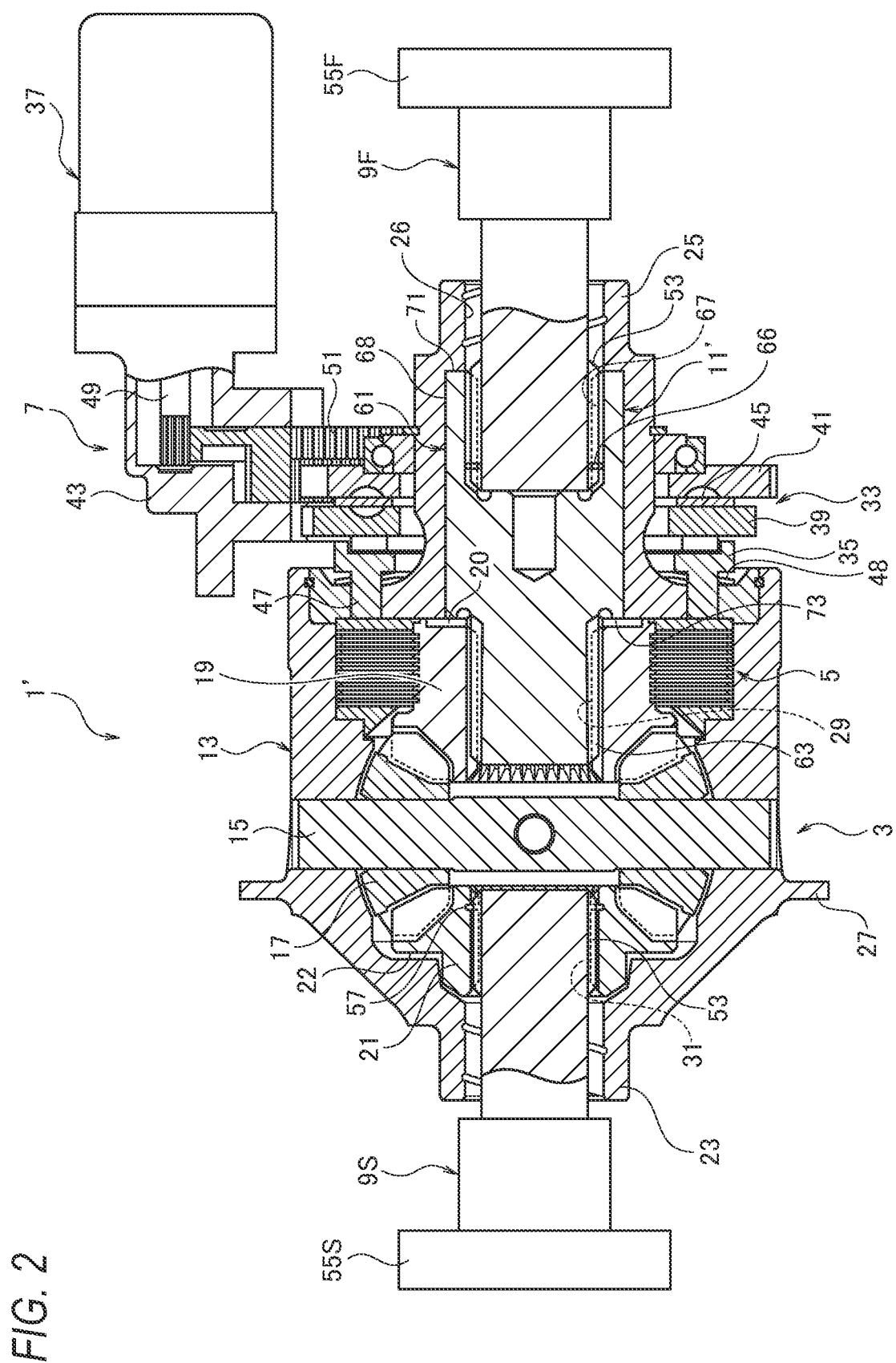
FIG. 2 is a cross-sectional view of a differential device according to a second embodiment.

As in FIG. 1, the differential device 1' shown in FIG. 2 is disposed, for example, between a drive source (not shown) such as an engine or an electric motor and right and left wheels (not shown). A drive force from the drive source is transmitted to the differential device 1' through a transmission (not shown), and is distributed to the left and right wheels through the pair of output shafts 9F, 9S.

An intermediate member 11' is structured by a single piece member in which the first connecting portion 63 and the second connecting portion 67 are integrated while spaced apart from each other on two end sides in the axial direction. The spline-shaped first connecting portion 63 is provided on an outer periphery on one axial end side of the intermediate member 11', and is integrally rotatably connected to the output portion 29 of the first output gear 19. The spline-shaped second connecting portion 67 is provided on an inner periphery on the other axial end side of the intermediate member 11'. The coupling portion 53 of the first output shaft 9 is integrally rotatably connected to the second connecting portion 67. A restriction member 66 such as a C clip is disposed between the second connecting portion 67 and the coupling portion 53 of the first output shaft 9F in the radial direction, so that the intermediate member 11' and the first output shaft 9F are held in a mutually coupled state in the axial direction.

The actuator 7 that actuates the interrupting mechanism is disposed on an outer peripheral side of the intermediate member 11'. The differential case 13 includes the boss portion 25 at an end portion in the axial direction. The large-diameter portion 68 of the intermediate member 11' is adjacent to one side in the axial direction of the boss portion 25, and the large-diameter portion 68 of the intermediate member 11' is larger in diameter than the inner peripheral diameter 26 of the boss portion. For this reason, lubricating oil flowing to the inner periphery of the boss portion 25 is distributed to the large-diameter portion 68 of the intermediate member 11' by a centrifugal force, and lubrication of an outer peripheral support sliding surface of the intermediate member 11' supported by the differential case 13 is excellent.

The intermediate member 11' includes the first end wall 71 and the second end wall 73 that are restricted from moving in the axial direction between the differential case 13 and the output gear 19. Accordingly, the intermediate member 11' structured by a single piece member in the differential case 13 can be accurately positioned in the axial direction.

In this way, unlike the first embodiment, the first connecting portion 59 and the second connecting portion 61 are integrally formed within the single piece intermediate member 11', and thus it is possible to reduce the number of components and reduce assembling backlash of the output shafts 9F, 9S, and to shorten the number of assembling steps of the differential device.

Figure 3:
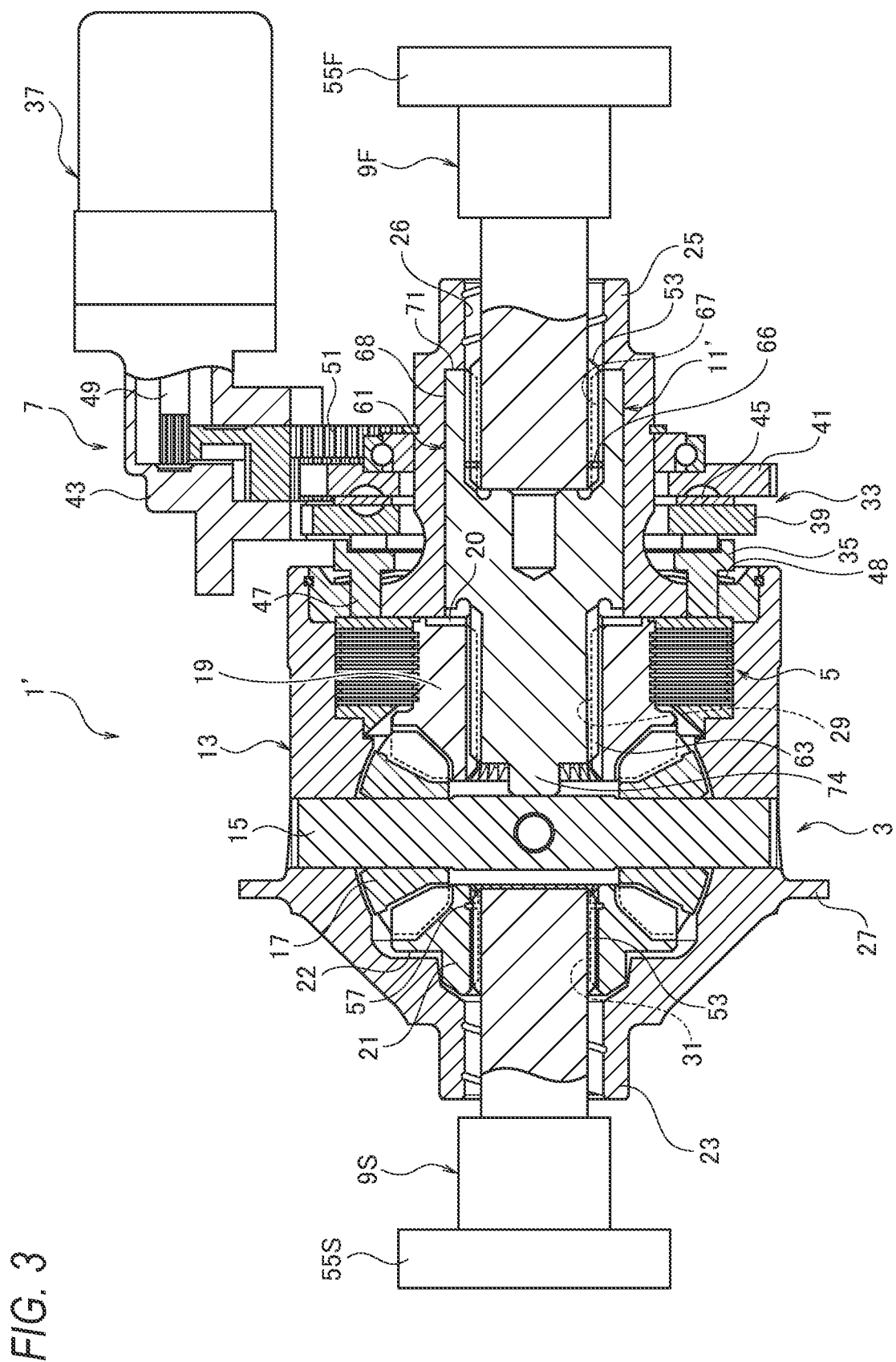
FIG. 3 is a cross-sectional view of a differential device of a modification of the second embodiment.

With regard to the movement restriction of the intermediate member 11' toward the one side in the axial direction, as shown in FIG. 3, an abutment portion 74 may be provided at an end of the first connecting portion 63 in the axial direction. By the abutment portion 74, the intermediate member 11' can be positioned on one side in the axial direction relative to the differential case side such as the pinion shaft 15 side and the like. According to the modification of the second embodiment shown in FIG. 3, the intermediate member 11' can be positioned on two sides in the axial direction in the differential case 13, and thus the load from the intermediate member 11' to the first output gear 19 can be reduced. In the structure of FIG. 3, a gap is provided between the second end wall 73 that would abut against the output gear 19 side and the output gear 19 to disable the abutment.

Although embodiments are described above, the present invention is not limited to the embodiments, and modifications are possible within the scope of the spirit of the present invention.

For example, the interrupting mechanism includes a multi-plate clutch in the above described embodiments, but the interrupting mechanism is not limited thereto and may be a different type interrupting mechanism such as a dog clutch, as long as the interrupting mechanism connects and disconnects power transmission between the differential case and the first output gear.

Further, the positioning in axially opposing directions of the pair of output shafts 9F, 9S having the same length may be performed by interposing a thrust block member between axially opposing end surfaces of the pair of output shafts 9F, 9S and abutting the thrust block member against the axially opposing end surfaces.

Further, although the actuator is an electric motor type actuator in which the electric motor of the drive source is shifted relative to the rotation shaft of the differential device in the above described embodiments, the actuator is not limited thereto. The actuator may be disposed in an annular manner so as to be coaxial with the rotation shaft of the differential device. The actuator may be an electromagnetic actuator, a hydraulic actuator, or the like. As long as the interrupting mechanism can be operated, the arrangement and the type of the actuator can be appropriately set from the configuration of the entire device, the space with the differential device, or from the viewpoint of functions.

An actuator may be omitted for the interrupting mechanism. When a differential rotation occurred between the right and left wheels, engagement reaction forces are generated between the pinion 17 and the pair output gears 19, 21, and the clutch in the interrupting mechanism can be actuated by the engagement reaction forces.

Moreover, the first output gear 19 and the intermediate member 11, 11' may be integrated into a single piece member. In this structure, the first output shaft 9F and the single piece member in which the first output gear 19 and the intermediate member 11 are integrated may be connected by the spline engagement.

What is claimed is:

1. A differential device comprising:
    a differential case that is rotatable and configured to receive input of a drive force;
    a first output gear and a second output gear that are accommodated in the differential case to be rotatable with respect to the differential case and to output the drive force received from the differential case; and
    an interrupting mechanism that is disposed on a side of the first output gear and is operable between a connecting condition where a relative rotation between the differential case and the first output gear is not allowed and a disconnecting condition where the relative rotation between the differential case and the first output gear is allowed,
    wherein the first output gear is coupled to an output shaft by an intermediate member,
    wherein the intermediate member and the output shaft are coupled to each other so that the intermediate member and the output shaft are always integrally rotatable,
    wherein the intermediate member is accommodated in the differential case throughout a whole length of the intermediate member in an axial direction,
    wherein the intermediate member includes a first connecting portion integrally rotatably connected to an inner peripheral side of the first output gear, and a second connecting portion integrally rotatably connected to an outer peripheral side of the output shaft, and
    wherein the intermediate member is a single piece member in which the first connecting portion and the second connecting portion are spaced apart from each other on two end sides in the axial direction.

2. The differential device according to claim 1, wherein the intermediate member includes a first end wall and a second end wall that restrict the intermediate member from moving in the axial direction between the differential case and the first output gear.

3. The differential device according to claim 1, wherein an actuator that actuates the interrupting mechanism is disposed on an outer peripheral side of the intermediate member.

4. The differential device according to claim 1, wherein the differential case includes a boss portion at an end portion in the axial direction,
    wherein a large-diameter portion of the intermediate member is adjacent to one side in the axial direction of the boss portion, and
    wherein the large-diameter portion of the intermediate member is larger in diameter than an inner diameter portion of the boss portion.

5. The differential device according to claim 1, wherein an end in the axial direction of the first connecting portion of the intermediate member is configured to abut against a pinion shaft fixed to the differential case.

\* \* \* \* \*